(12) United States Patent
Chiou

(10) Patent No.: US 7,445,123 B1
(45) Date of Patent: Nov. 4, 2008

(54) CERAMIC FILTER WITH A CERAMIC FILTER CORE CLEANING DEVICE

(76) Inventor: Wen-Liang Chiou, No. 10, Lane 137, Chung Cheng 1 Rd., Ying Ko Chen, Taipei Hsien (TW)

( * ) Notice: Subject to any disclaimer, the term of this patent is extended or adjusted under 35 U.S.C. 154(b) by 15 days.

(21) Appl. No.: 11/775,229

(22) Filed: Jul. 10, 2007

(51) Int. Cl.
*B01D 29/64* (2006.01)

(52) U.S. Cl. .................. 210/415; 210/223; 210/232; 210/407; 210/413; 210/437; 210/440; 210/441; 210/457

(58) Field of Classification Search .................. 210/223, 210/232, 407, 413, 415, 437, 440, 441, 457
See application file for complete search history.

(56) References Cited

U.S. PATENT DOCUMENTS

| 3,202,287 | A | * | 8/1965 | Szwargulski et al. | ........ 210/448 |
| 5,080,788 | A | * | 1/1992 | Chen | .......................... 210/415 |
| 5,262,069 | A | * | 11/1993 | Kato | .......................... 210/408 |
| 6,843,914 | B2 | * | 1/2005 | Jablonsky | ................... 210/391 |

* cited by examiner

*Primary Examiner*—David A Reifsnyder
(74) *Attorney, Agent, or Firm*—Pai Patent & Trademark Law Firm; Chao-Chang David Pai

(57) ABSTRACT

A ceramic filter in which support rods are connected between two inner covers at the top and bottom sides of the ceramic filter core to hold a respective scraper against the periphery of the ceramic filter core, and a rotary outer cover is provided and connected to one inner cover by means of magnetic attraction such that when the rotary outer cover is rotated, the scrapers are moved against the periphery of the ceramic filter core to remove dirt from the ceramic filter core.

14 Claims, 6 Drawing Sheets

CERAMIC FILTER WITH A CERAMIC FILTER CORE CLEANING DEVICE

BACKGROUND OF THE INVENTION (a) Field of the Invention

The present invention relates to ceramic filters and more particularly to a ceramic filter with a ceramic filter core cleaning device, which uses magnetic attraction to move scrapers against the periphery of the ceramic filter core, thereby removing dirt from the ceramic filter core.

(b) Description of the Prior Art

The ceramic filter core of a ceramic filter must be regularly cleaned to ensure normal filtering function and to provide clean water. If the ceramic filter core is not regularly cleaned, the ceramic filter core may be blocked and unable to carry out the filtering function, resulting in poor water quality. Therefore, cleaning of ceramic filter core is a requisite and important step in proper maintenance of the ceramic filter.

SUMMARY OF THE INVENTION

The present invention has been accomplished under the circumstances in view. It is one object of the present invention to provide a ceramic filter with a ceramic filter core cleaning device, which uses magnetic attraction to move scrapers against the periphery of the ceramic filter core, thereby removing dirt from the ceramic filter core rapidly and efficiently.

It is another object of the present invention to provide a ceramic filter with a ceramic filter core cleaning device, which allows a scraper to move along the periphery of the ceramic filter core to remove dirt in an electrical mode or manual mode to facilitate the cleaning operation of the ceramic filter.

DETAILED DESCRIPTION OF THE PREFERRED EMBODIMENTS

Figure 1:
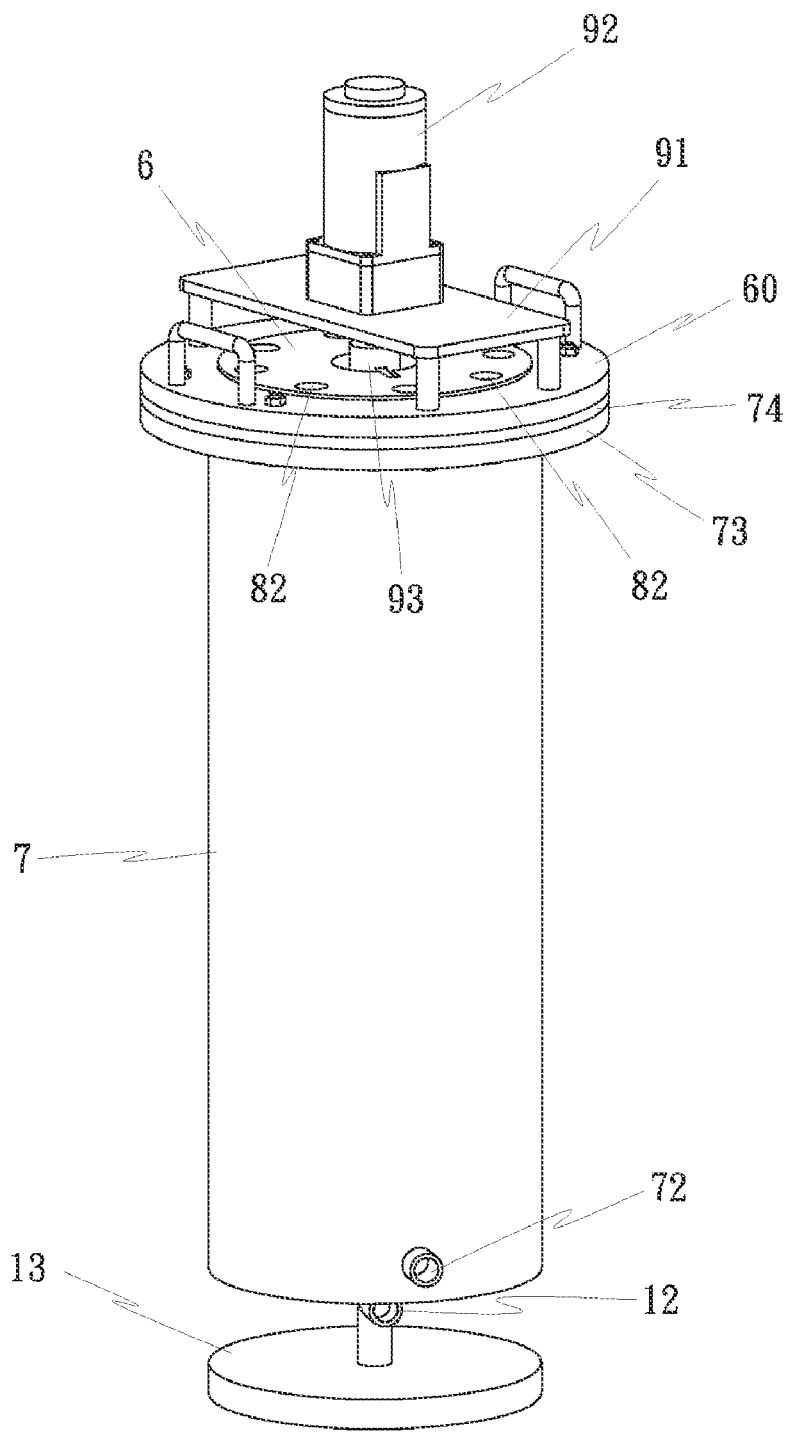
FIG. 1 is a side elevation of a ceramic filter in accordance with the present invention.
Figure 2:
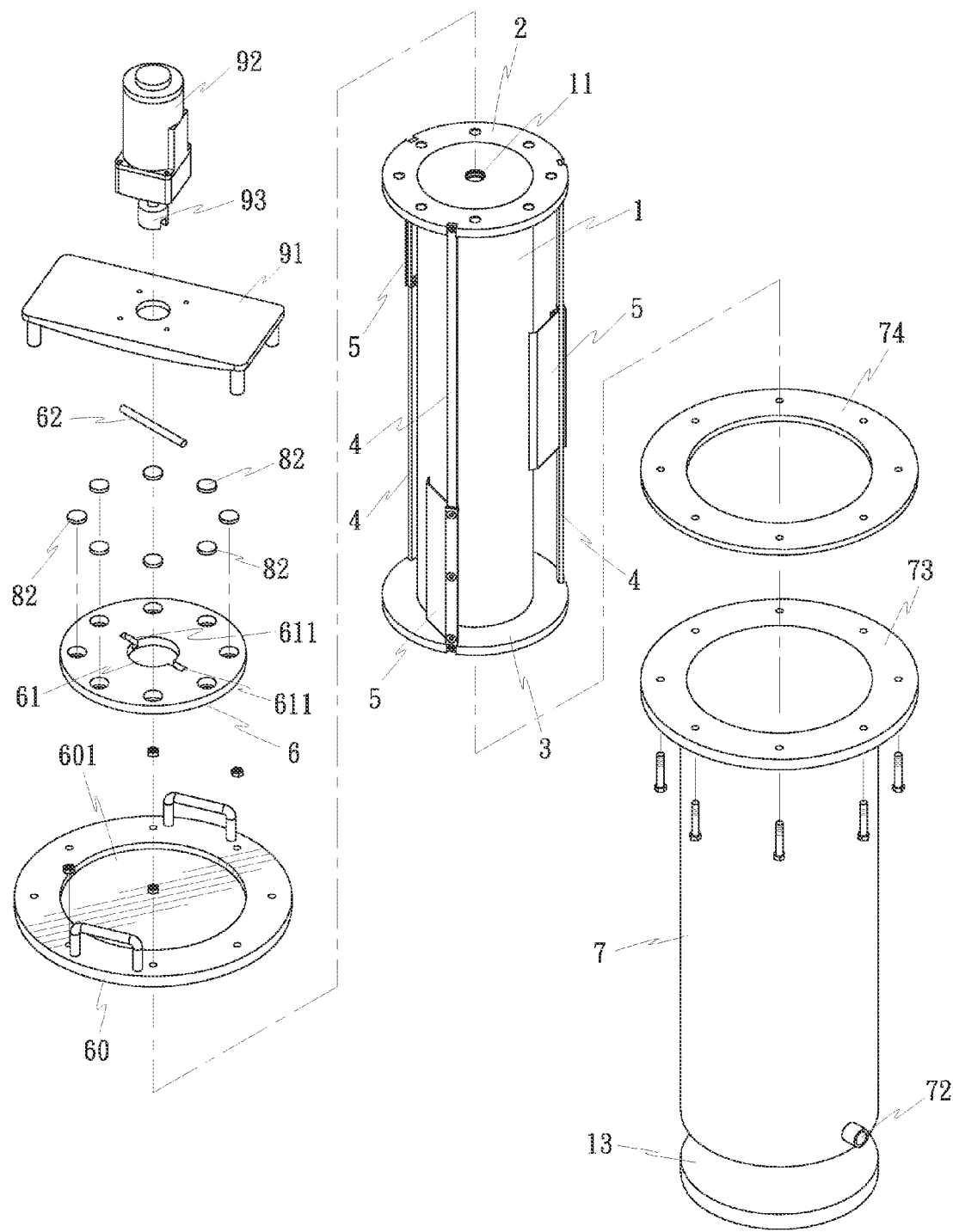
FIG. 2 is an exploded view of the ceramic filter in accordance with the present invention.

Referring to FIGS. 1 and 2, a ceramic filter with a ceramic filter core cleaning device in accordance with the present invention is shown comprised of a ceramic filter core 1, two inner covers 2 and 3, at least one support rod 4, at least one scraper 5, a rotary outer cover 6, and a housing 7.

Figure 3:
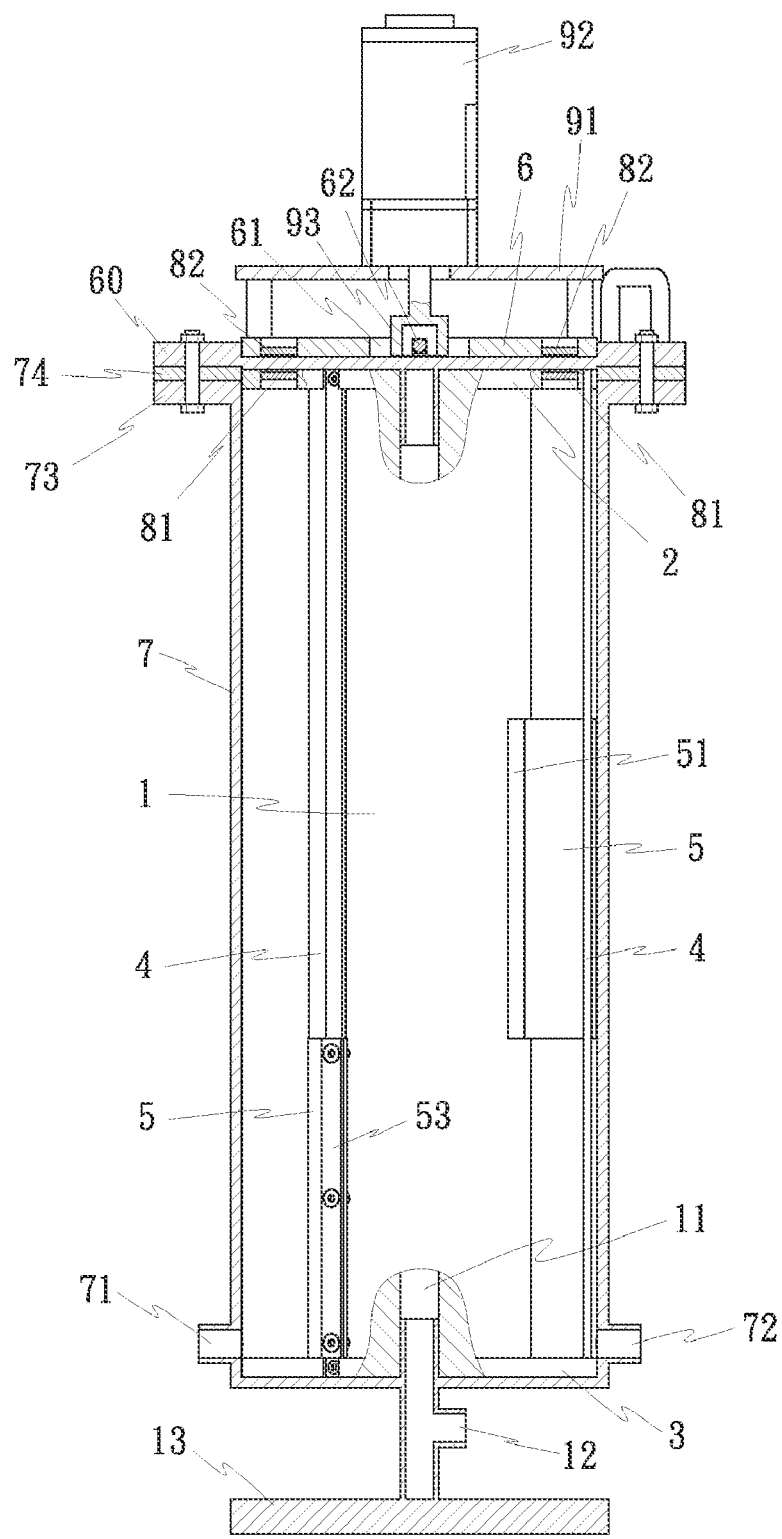
FIG. 3 is a sectional side view of the ceramic filter in accordance with the present invention.

The ceramic filter core 1, as shown in FIG. 3, is made of a ceramic material for installation in the housing 7 and has a center hole 11 axially extending through the top and bottom ends thereof. The housing 7 has a water inlet 71, and a drain hole 72 that is normally closed. When water enters the water inlet 71, the ceramic filter core 1 filters water running through it, and filtered clean water flows out of the center hole 11 through a fitting 12. Further, a base block 13 is fixedly provided at the bottom side of the fitting 12. Further, the drain hole 72 may be connected to the water inlet of another water filter or a set of water filters, constituting a parallel or series network of filters.

Figure 4:
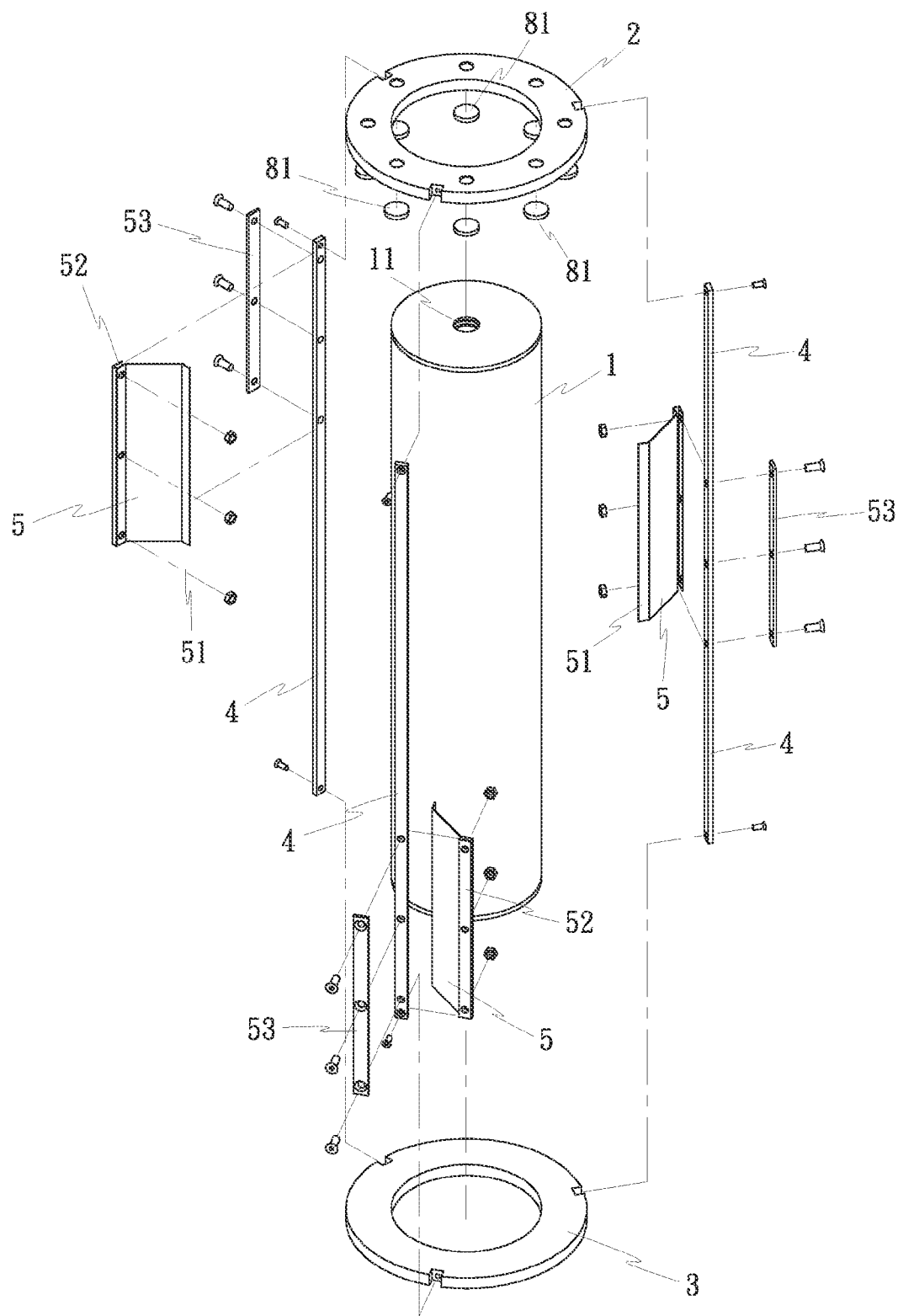
FIG. 4 is an exploded view of a part of the ceramic filter in accordance with the present invention.

The two inner covers 2 and 3, as shown in FIG. 4, are respectively provided at the top and bottom sides of the ceramic filter core 1. At least one magnet 81 is installed—for example, embedded—in one inner cover 2 or 3. According to this embodiment, multiple magnets 81 are mounted in one side of the inner cover 2 and are equiangularly spaced around the periphery of the inner cover 2.

The at least one, for example, three support rods 4 are fixedly connected between the two inner covers 2 and 3 and equiangularly spaced around the ceramic filter core 1 (see FIG. 4).

Figure 5:
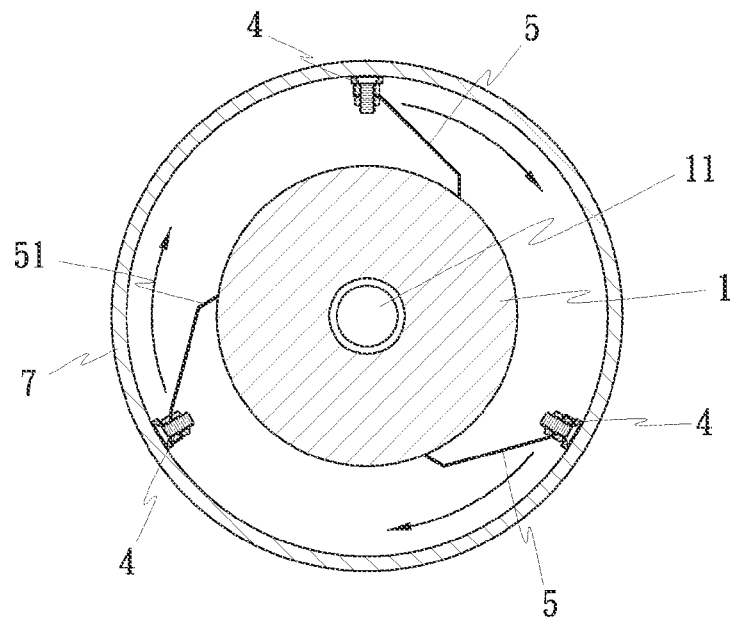
FIG. 5 is a cross sectional view of the ceramic filter in accordance with the present invention.

The at least one scraper 5 each is a blade member made of thin-sheet stainless steel or any of a variety of other resilient materials. According to this embodiment, 3 scrapers 5 are used and respectively affixed to the support rods 4 at three different elevations, each having a scraping edge 51 disposed at one side and resiliently pressed on the periphery of the ceramic filter core 1. By means of this arrangement, the three scrapers 5 cover the whole periphery of the ceramic filter core 1 (see FIGS. 4 and 5).

The rotary outer cover 6, as shown in FIGS. 1~3, is rotatably supported on a locating plate 60, which is affixed to the top open side 73 of the housing 7. The locating plate 60 has a circular top recess 601 for receiving the rotary outer cover 6. A gasket 74 is sandwiched between the housing 7 and the locating plate 60. The rotary outer cover 6 has a center hole 61 cut through its top and bottom sides, and two retaining grooves 611 formed on the top wall and radially extending from the center through hole 61 at two opposite sides for the positioning of a pin 62. At least one, for example, multiple magnets 82 are mounted in the rotary outer cover 6 corresponding to the magnets 81 provided at the inner cover 2 to cause magnetic attraction.

Figure 6:
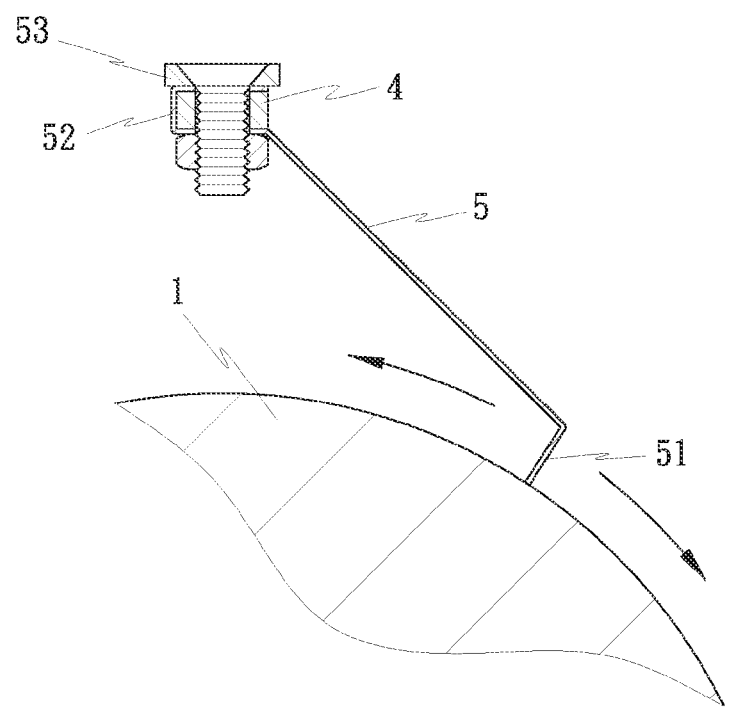
FIG. 6 is a schematic drawing showing the scrapers moving along the periphery of the ceramic filter core according to the present invention.

As stated above, support rods 4 are connected between the inner covers 2 and 3 at the top and bottom sides of the ceramic filter core 1 around the periphery of the ceramic filter core 1, scrapers 5 are respectively fastened to the support rods 4 and resiliently pressed on the periphery of the ceramic filter core 1, and magnets 81 and 82 are respectively provided at one inner cover 2 and rotary outer cover 6 to cause magnetic attraction between the magnets 81 and 82. When the rotary outer cover 6 is rotated, the inner cover 2 is rotated with the rotary outer cover 6 due to the magnetic attraction between the magnets 81 and 82, and therefore the scrapers 5 are moved with the support rods 4 and the inner cover 2 over the periphery of the ceramic filter core 1 in clockwise direction (or counter-clockwise direction), thereby removing dirt from the periphery of the ceramic filter core 1 (see FIG. 6).

As stated above, the scrapers 5 are resiliently pressed on the periphery of the ceramic filter core 1. When removing dirt from the periphery of the ceramic filter core 1, the friction between the scrapers 5 and the periphery of the ceramic filter core 1 will also cause the periphery of the ceramic filter core 1 to wear away. However, the wear resistance characteristic of the ceramic material of the ceramic filter core 1 enables the ceramic filter core 1 to work long. A replacement of the ceramic filter core 1 is necessary only when the scrapers 5 cannot touch the periphery of the ceramic filter core 1.

When cleaning the ceramic filter core 1, the drain hole 72 can be opened to discharge dirty water. Normally, the drain hole 72 is sealed. Further, the drain hole 72 can be connected to the water inlet of another water filter or a set of water filters, constituting a parallel or series network of filters.

Referring to FIG. 4, each scraper 5 has a mounting portion 52 disposed at one side opposite to the scraping edge 51 and affixed to one support rod 4 with a packing strip 53. The packing strip 53 is pressed on the mounting portion 52 against the corresponding support rod 4, and affixed with the mounting portion 52 to the corresponding support rod 4 with screws, rivets or the like (not shown). Therefore, the packing strip 53 holds down the scraper 5, preventing displacement of the scraper 5 relative to the corresponding support rod 4.

The rotary outer cover 6 can be rotated electrically or manually. According to the embodiment shown in FIGS. 1~3, a mount 91 is fixedly provided at the top side of the locating plate 60 to support a motor 92. The motor 92 has an output shaft 93 connected to the pin 62 at the rotary outer cover 6. When the motor 92 is started, the rotary outer cover 6 is rotated with the output shaft 93 of the motor 92, thereby moving the scrapers 5 over the periphery of the ceramic filter core 1.

Figure 7:
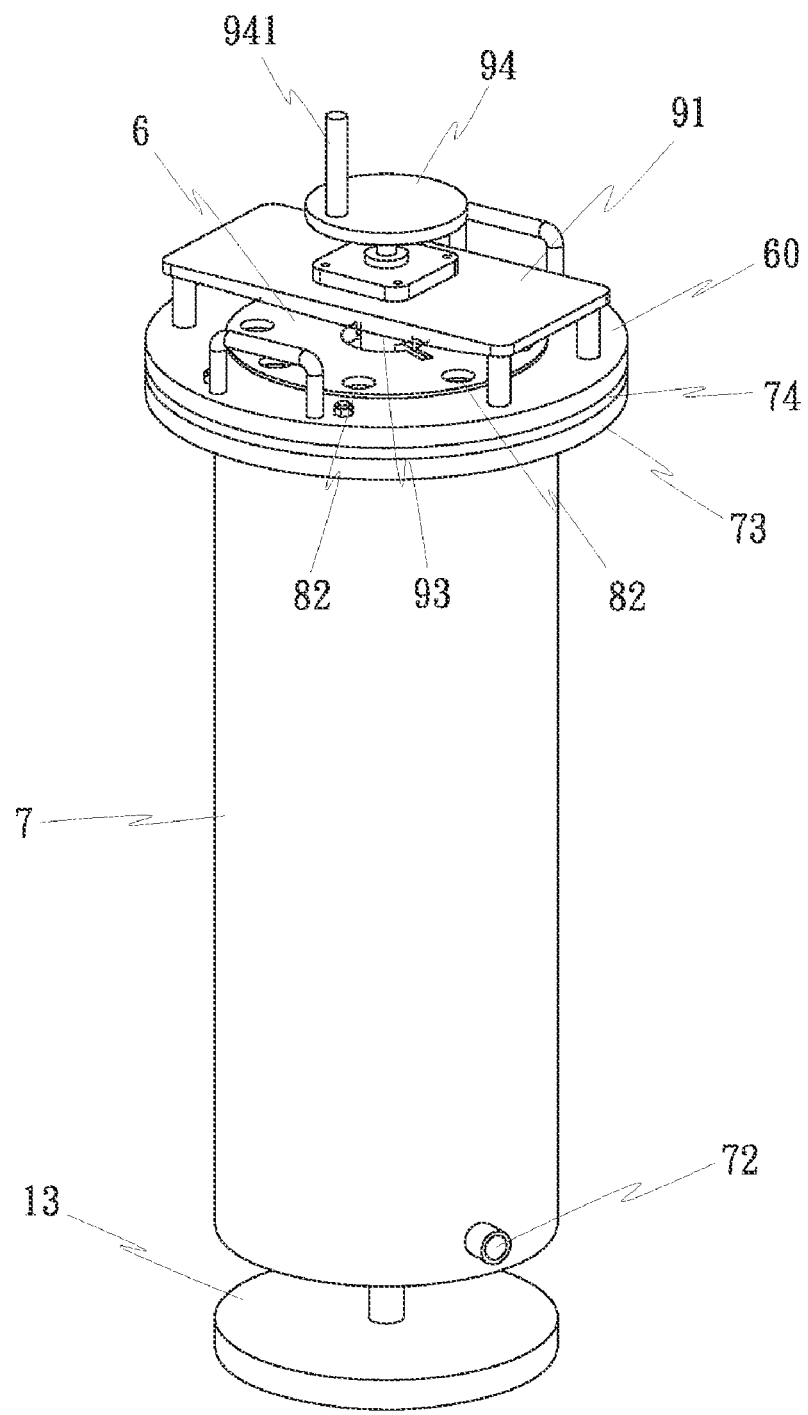
FIG. 7 is a side elevation of an alternate form of the ceramic filter in accordance with the present invention.

In an alternate form of the present invention as shown in FIG. 7, a hand wheel 94 having an eccentric handle 941 is used instead of the aforesaid motor 92 and connected to the pin 62 at the rotary outer cover 6 for operation by hand to move the scrapers over the periphery of the ceramic filter core 1.

Although particular embodiments of the invention have been described in detail for purposes of illustration, various modifications and enhancements may be made without departing from the spirit and scope of the invention.

What is claimed is:

1. A ceramic filter comprising a ceramic filter core, two inner covers, at least one support rod, at least one scraper, a rotary outer cover, a fitting, and a housing, said ceramic filter core being mounted inside said housing and having a center hole axially extending through top and bottom sides thereof, said housing having a water inlet for guiding water into said ceramic filter core for filtration and a closable drain hole, said fitting being connected to the center hole of said ceramic filter element for output of filtered water, wherein said two inner covers are respectively provided at the top and bottom sides of said ceramic filter core, one of said inner covers being provided with at least one magnet;

said at least one support rod each is fixedly connected between said two inner covers;

said at least one scraper is fastened to said at least one support rod, said at least one scraper each having a front end pressed on the periphery of said ceramic filter core;

said rotary outer cover is disposed adjacent to the inner cover provided with at least one magnet, said rotary outer cover having at least one magnet, which attracts the at least one magnet provided at the inner cover for allowing synchronous rotation of the inner cover provided with at least one magnet upon rotation of said rotary outer cover so that when said rotary outer cover is rotated, said inner covers are rotated with said rotary outer cover to move said at least one scraper over the periphery of said ceramic filter core.

2. The ceramic filter as claimed in claim 1, wherein the at least one magnet of the associated inner cover is embedded in the associated inner cover.

3. The ceramic filter as claimed in claim 1, wherein the number of said at least one support rod is 3, and these three support rods are equiangularly spaced around said ceramic filter core.

4. The ceramic filter as claimed in claim 3, wherein the number of said at least one scraper is 3, and these three scrapers are respectively fastened to said three support rods at three different elevations.

5. The ceramic filter as claimed in claim 1, wherein said at least one scraper each is a resilient blade member resiliently pressed on the periphery of said ceramic filter core.

6. The ceramic filter as claimed in claim 5, wherein the front end of each of said at least one scraper has a scraping edge.

7. The ceramic filter as claimed in claim 5, wherein said at least one scraper is made of stainless steel.

8. The ceramic filter as claimed in claim 1, wherein said rotary outer cover has a center hole, two locating grooves radially extending from the center hole of said rotary outer cover at two opposite sides, and a pin disposed in said locating grooves.

9. The ceramic filter as claimed in claim 1, wherein the at least one magnet of said rotary outer cover is embedded in said rotary outer cover.

10. The ceramic filter as claimed in claim 1, wherein said at least one scraper each has a rear end terminating in a mounting portion, said mounting portion being fastened to said at least one support rod with a packing strip.

11. The ceramic filter as claimed in claim 1, wherein said rotary outer cover is rotatably supported on a locating plate that is locked to an open side of said housing, said locating plate having a top recess for accommodating said rotary outer cover.

12. The ceramic filter as claimed in claim 11, wherein a gasket is sandwiched in between said open side of said housing and said locating plate.

13. The ceramic filter as claimed in claim 11, wherein said locating plate is provided with a mount and a motor supported by said mount, said motor having an output shaft adapted to rotate said rotary outer cover.

14. The ceramic filter as claimed in claim 11, wherein said locating plate is provided with a mount and a hand wheel supported by said mount, said hand wheel being coupled to said rotary outer cover and having an eccentric handle for operation by hand to rotate said rotary outer cover.

* * * * *